United States Patent
Antonakakis et al.

(10) Patent No.: US 9,922,190 B2
(45) Date of Patent: Mar. 20, 2018

(54) METHOD AND SYSTEM FOR DETECTING DGA-BASED MALWARE

(71) Applicant: DAMBALLA, INC., Atlanta, GA (US)

(72) Inventors: Manos Antonakakis, Dunwoody, GA (US); Roberto Perdisci, Smyrna, GA (US); Wenke Lee, Atlanta, GA (US); Nikolaos Vasiloglou, II, Atlanta, GA (US)

(73) Assignee: Damballa, Inc., Atlanta, GA (US)

( * ) Notice: Subject to any disclaimer, the term of this patent is extended or adjusted under 35 U.S.C. 154(b) by 0 days.

(21) Appl. No.: 13/749,205

(22) Filed: Jan. 24, 2013

(65) Prior Publication Data

US 2013/0191915 A1 Jul. 25, 2013

Related U.S. Application Data

(60) Provisional application No. 61/590,633, filed on Jan. 25, 2012.

(51) Int. Cl.
*H04L 29/06* (2006.01)
*G06F 21/55* (2013.01)
*G06F 21/56* (2013.01)

(52) U.S. Cl.
CPC ............ *G06F 21/55* (2013.01); *G06F 21/566* (2013.01); *H04L 63/14* (2013.01)

(58) Field of Classification Search
None
See application file for complete search history.

(56) References Cited

U.S. PATENT DOCUMENTS

| 7,043,759 B2 | 5/2006 | Kaaschoek et al. |
| 7,185,368 B2 | 2/2007 | Copeland, III |
| 7,278,163 B2 | 10/2007 | Banzhof |

(Continued)

OTHER PUBLICATIONS

Nan Jiang, Jin Cao, Yu Jin, Li Erran Li, and Zhi-Li Zhang. 2010. Identifying suspicious activities through DNS failure graph analysis. In Proceedings of the The 18th IEEE International Conference on Network Protocols (ICNP '10). IEEE Computer Society, Washington, DC, USA, 144-153.*

(Continued)

*Primary Examiner* — Jeffery Williams
(74) *Attorney, Agent, or Firm* — Pepper Hamilton LLP (57) ABSTRACT

System and method for detecting a domain generation algorithm (DGA), comprising: performing processing associated with clustering, utilizing a name-based features clustering module accessing information from an electronic database of NX domain information, the randomly generated domain names based on the similarity in the make-up of the randomly generated domain names; performing processing associated with clustering, utilizing a graph clustering module, the randomly generated domain names based on the groups of assets that queried the randomly generated domain names; performing processing associated with determining, utilizing a daily clustering correlation module and a temporal clustering correlation module, which clustered randomly generated domain names are highly correlated in daily use and in time; and performing processing associated with determining the DGA that generated the clustered randomly generated domain names.

18 Claims, 4 Drawing Sheets

(56) References Cited

U.S. PATENT DOCUMENTS

| | | | |
|---|---|---|---|
| 7,290,283 | B2 | 10/2007 | Copeland, III |
| 7,475,426 | B2 | 1/2009 | Copeland, III |
| 7,549,169 | B1 | 1/2009 | Sobel et al. |
| 7,512,980 | B2 | 3/2009 | Copeland, III et al. |
| 7,644,150 | B1 | 1/2010 | Nucci et al. |
| 7,644,151 | B2 | 1/2010 | Jerrim et al. |
| 7,712,134 | B1 | 5/2010 | Nucci et al. |
| 7,882,542 | B2 | 2/2011 | Neystadt |
| 7,886,358 | B2 | 2/2011 | Copeland, III |
| 7,895,326 | B2 | 2/2011 | Jerrim et al. |
| 8,065,722 | B2 | 11/2011 | Barford et al. |
| 8,170,966 | B1 | 5/2012 | Musat et al. |
| 8,180,916 | B1 | 5/2012 | Mucci et al. |
| 8,200,761 | B1 | 6/2012 | Tevanian |
| 8,260,914 | B1* | 9/2012 | Ranjan .................... 709/224 |
| 8,402,543 | B1 | 3/2013 | Ranjan et al. |
| 8,418,249 | B1 | 4/2013 | Nucci et al. |
| 8,484,377 | B1 | 7/2013 | Chen et al. |
| 8,516,585 | B2* | 8/2013 | Cao et al. .................... 726/23 |
| 8,527,592 | B2 | 9/2013 | Gabe |
| 8,631,489 | B2 | 1/2014 | Antonakakis et al. |
| 8,826,438 | B2 | 9/2014 | Perdisci et al. |
| 8,832,829 | B2 | 9/2014 | Manni et al. |
| 9,306,969 | B2 | 4/2016 | Dagon et al. |
| 9,516,058 | B2 | 12/2016 | Antonakakis et al. |
| 2001/0014093 | A1 | 8/2001 | Yoda et al. |
| 2002/0166063 | A1 | 11/2002 | Lachman et al. |
| 2002/0178238 | A1 | 11/2002 | Fletcher et al. |
| 2003/0145233 | A1 | 7/2003 | Poletto et al. |
| 2003/0236995 | A1 | 12/2003 | Fretwell, Jr. |
| 2004/0039798 | A1 | 2/2004 | Hotz et al. |
| 2004/0044791 | A1 | 3/2004 | Pouzzner |
| 2004/0088346 | A1 | 5/2004 | Yeager |
| 2004/0088348 | A1 | 5/2004 | Yeager |
| 2004/0181687 | A1 | 9/2004 | Nachenberg et al. |
| 2005/0036501 | A1 | 2/2005 | Chung et al. |
| 2005/0044406 | A1 | 2/2005 | Stute |
| 2005/0050377 | A1 | 3/2005 | Chan et al. |
| 2005/0086523 | A1 | 4/2005 | Zimmer et al. |
| 2005/0210534 | A1 | 9/2005 | Krishnamurthy |
| 2005/0278540 | A1 | 12/2005 | Cho |
| 2006/0026682 | A1 | 2/2006 | Zakas |
| 2006/0031483 | A1 | 2/2006 | Lund |
| 2006/0067240 | A1 | 3/2006 | Kim et al. |
| 2006/0068806 | A1 | 3/2006 | Nam |
| 2006/0078096 | A1 | 4/2006 | Poyhonen |
| 2006/0150249 | A1 | 7/2006 | Gassen et al. |
| 2006/0174345 | A1 | 8/2006 | Flanagan et al. |
| 2006/0176822 | A1 | 8/2006 | Doyle et al. |
| 2006/0212925 | A1* | 9/2006 | Shull et al. .................... 726/1 |
| 2006/0212942 | A1 | 9/2006 | Barford et al. |
| 2006/0253581 | A1 | 11/2006 | Dixon |
| 2006/0265436 | A1 | 11/2006 | Edmond |
| 2006/0288415 | A1 | 12/2006 | Wong |
| 2007/0056038 | A1 | 3/2007 | Lok |
| 2007/0076606 | A1 | 4/2007 | Olesinski |
| 2007/0136455 | A1 | 6/2007 | Lee et al. |
| 2007/0198679 | A1 | 8/2007 | Duyanovich et al. |
| 2007/0209074 | A1 | 9/2007 | Coffman |
| 2007/0253377 | A1 | 11/2007 | Janneteau et al. |
| 2007/0294339 | A1 | 12/2007 | Ala-Kleemola et al. |
| 2008/0005555 | A1 | 1/2008 | Lotem et al. |
| 2008/0016570 | A1 | 1/2008 | Capalik |
| 2008/0177755 | A1 | 7/2008 | Stern et al. |
| 2008/0178293 | A1 | 7/2008 | Keen et al. |
| 2008/0195369 | A1 | 8/2008 | Duyanovich et al. |
| 2008/0222729 | A1 | 9/2008 | Chen et al. |
| 2009/0138590 | A1 | 5/2009 | Lee et al. |
| 2009/0171871 | A1 | 7/2009 | Zhang et al. |
| 2009/0241190 | A1 | 9/2009 | Todd et al. |
| 2009/0254989 | A1* | 10/2009 | Achan ................. H04L 63/1441 726/22 |
| 2009/0265777 | A1 | 10/2009 | Scott |
| 2010/0011420 | A1 | 1/2010 | Drako |
| 2010/0017487 | A1 | 1/2010 | Patinkin |
| 2010/0034109 | A1 | 2/2010 | Shomura et al. |
| 2010/0037314 | A1 | 2/2010 | Perdisci et al. |
| 2010/0043047 | A1 | 2/2010 | Archer et al. |
| 2010/0071068 | A1 | 3/2010 | Bauschert et al. |
| 2010/0077481 | A1 | 3/2010 | Polyakov et al. |
| 2010/0082758 | A1 | 4/2010 | Golan |
| 2010/0235915 | A1 | 9/2010 | Memon et al. |
| 2010/0319069 | A1 | 12/2010 | Granstedt |
| 2011/0040706 | A1 | 2/2011 | Sen et al. |
| 2011/0055123 | A1 | 3/2011 | Kennedy |
| 2011/0067106 | A1 | 3/2011 | Evans et al. |
| 2011/0185423 | A1 | 7/2011 | Sallam |
| 2011/0185428 | A1* | 7/2011 | Sallam .................... 726/24 |
| 2012/0079101 | A1 | 3/2012 | Muppala et al. |
| 2012/0084860 | A1* | 4/2012 | Cao et al. .................... 726/23 |
| 2012/0102568 | A1 | 4/2012 | Tarbotton et al. |
| 2012/0143650 | A1 | 6/2012 | Crowley et al. |
| 2012/0151585 | A1 | 6/2012 | Lamastra et al. |
| 2012/0198549 | A1 | 8/2012 | Antonakakis |
| 2012/0215909 | A1 | 8/2012 | Goldfarb et al. |
| 2013/0054802 | A1 | 2/2013 | Donzis et al. |
| 2013/0174253 | A1* | 7/2013 | Thomas ............. H04L 63/1416 726/22 |
| 2013/0232574 | A1* | 9/2013 | Carothers .................... 726/22 |
| 2014/0068763 | A1 | 3/2014 | Ward et al. |
| 2014/0068775 | A1 | 3/2014 | Ward et al. |
| 2014/0075558 | A1 | 3/2014 | Ward et al. |
| 2014/0090058 | A1 | 3/2014 | Ward et al. |
| 2014/0289854 | A1 | 9/2014 | Mahvi |
| 2015/0026808 | A1* | 1/2015 | Perdisci ................. G06F 21/56 726/23 |
| 2015/0222654 | A1 | 8/2015 | Crowley et al. |
| 2016/0156660 | A1 | 6/2016 | Dagon et al. |
| 2016/0285894 | A1 | 9/2016 | Nelms et al. |

OTHER PUBLICATIONS

Guofei Gu, Roberto Perdisci, Junjie Zhang, and Wenke Lee. 2008. BotMiner: clustering analysis of network traffic for protocol-and structure-independent botnet detection. In Proceedings of the 17th conference on Security symposium (SS'08). USENIX Association, Berkeley, CA, USA, 139-154.*

Sandeep Yadav, Ashwath Kumar Krishna Reddy, A.L. Narasimha Reddy, and Supranamaya Ranjan. 2010. Detecting algorithmically generated malicious domain names. In Proceedings of the 10th ACM SIGCOMM conference on Internet measurement (IMC '10). ACM, New York, NY, USA, 48-61. DOI=http://dx.doi.org/10.1145/1879141.1879148.*

Bailey et al., "Automated Classification and Analysis of Internet Malware", 2007, Lecture Notes in Computer Science, vol. 4637. Springer, Berlin, Heidelberg, p. 178-197.*

Park et al., "Fast malware classification by automated behavioral graph matching", 2010. In Proceedings of the Sixth Annual Workshop on Cyber Security and Information Intelligence Research (CSIIRW '10), ACM, p. 1-4.*

File History of U.S. Appl. No. 14/015,582.

File History of U.S. Appl. No. 14/015,704.

File History of U.S. Appl. No. 14/194,076.

Leo Breiman, "Bagging Predictors", Machine Learning, vol. 24, pp. 123-140 (1996).

David S. Anderson et al., "Spamscatter: Characterizing Internet Scam Hosting Infrastructure", Proceedings of the USENIX Security Symposium (2007) (14 pages).

Sujata Garera et al., "A Framework for Detection and Measurement of Phishing Attacks", WORM'07, pp. 1-8, Nov. 2, 2007.

Torsten Horthorn et al., "Double-Bagging: Combining Classifiers by Bootstrap Aggregation", Pattern Recognition, vol. 36, pp. 1303-1309 (2003).

Roberto Perdisci et al., "Detecting Malicious Flux Service Networks Through Passive Analysis of Recursive DNS Traces", Proceedings of ACSAC, Honolulu, Hawaii, USA (2009) (10 pages).

Shuang Hao et al., "Detecting Spammers with SNARE: Spatiotemporal Network-Level Automatic Reputation Engine", 18th USENIX Security Symposium, pp. 101-117 (2009).

(56) References Cited

OTHER PUBLICATIONS

Kazumichi Sato et al., "Extending Black Domain Name List by Using Co-Occurrence Relation Between DNS Queries", Presentation in the Third USENIX LEET Workshop (2010) (22 pages).
Sushant Sinha et al., "Shades of Grey: On the Effectiveness of Reputation-Based Blacklists", In 3rd International Conference on MALWARE (2008) (8 pages).
Zhiyun Qian et al., "On Network-Level Clusters for Spam Detection", In Proceedings of the USENIX NDSS Symposium (2010) (17 pages).
Bojan Zdrnja et al., "Passive Monitoring of DNS Anomalies", In Proceedings of DIMVA Conference (2007) (11 pages).
Jian Zhang et al., "Highly Predictive Blacklisting", In Proceedings of the USENIX Security Symposium (2008) (16 pages).
http://www.uribl.com/about.shtml, retrieved from Internet Archive on Mar. 16, 2016, Archived Jul. 22, 2010 (4 pages).
http://www.spamhaus.org/zen/, retrieved from Internet Archive on Mar. 16, 2016, Archived Jul. 6, 2010 (3 pages).
Mathew Sullivan, "Fighting Spam by Finding and Listing Exploitable Servers", Apricot 2006 (26 pages).
Mekky et al. (Detecting Malicious HTTP Redirections Using Trees of User Browser Activity, IEEE INFOCOM 2014, pp. 1159-1167).
File History of U.S. Appl. No. 14/010,016.
File History of U.S. Appl. No. 14/015,663.
File History of U.S. Appl. No. 14/305,998.
File History of U.S. Appl. No. 15/019,272.
Nan Jiang et al., "Identifying Suspicious Activities Through DNS Failure Graph Analysis", In proceedings of the 18th IEEE International Conference on Network Protocols (ICNP'10) IEEE Computer Society, Washington, DC, USA, 144-153 (2010).
File History of U.S. Appl. No. 12/538,612.
File History of U.S. Appl. No. 13/205,928.
File History of U.S. Appl. No. 13/309,202.
File History of U.S. Appl. No. 14/015,621.
File History of U.S. Appl. No. 14/015,661.
File History of U.S. Appl. No. 14/041,796.
File History of U.S. Appl. No. 14/096,803.
File History of U.S. Appl. No. 14/317,785.
File History of U.S. Appl. No. 14/616,387.
File History of U.S. Appl. No. 14/668,329.
U.S. Appl. No. 11/538,212, 2008-0028463, filed Jan. 31, 2008, U.S. Pat. No. 8,566,928.
U.S. Appl. No. 12/538,612, 2010-0037314, filed Feb. 11, 2010, Pending.
U.S. Appl. No. 12/985,140, 2011-0167495, filed Jul. 7, 2011, U.S. Pat. No. 8,578,497.
U.S. Appl. No. 13/008,257, 2011-0283361, filed Nov. 17, 2011, U.S. Pat. No. 8,826,438.
U.S. Appl. No. 13/205,928, 2012-0042381, filed Feb. 16, 2012, Pending.
U.S. Appl. No. 13/309,202, 2012-0143650, filed Jun. 7, 2012, Pending.
U.S. Appl. No. 13/358,303, 2012-0198549, filed Aug. 2, 2012, U.S. Pat. No. 8,631,489.
U.S. Appl. No. 13/749,205, 2013-0191915, filed Jul. 25, 2013, Pending.
U.S. Appl. No. 14/010,016, 2014-0059216, filed Feb. 27, 2014, Pending.
U.S. Appl. No. 14/015,582, 2014-0068763, filed Mar. 6, 2014, Pending.
U.S. Appl. No. 14/015,621, 2014-0075558, filed Mar. 13, 2014, Pending.
U.S. Appl. No. 14/015,663, 2014-0090058, filed Mar. 27, 2014, Pending.
U.S. Appl. No. 14/015,704, 2014-0068775, filed Mar. 6, 2014, Pending.
U.S. Appl. No. 14/015,661, 2014-0245436, filed Aug. 28, 2014, Pending.
U.S. Appl. No. 14/041,796, 2014-0101759, filed Apr. 10, 2014, Pending.
U.S. Appl. No. 14/096,803, 2014-0157414, filed Jun. 5, 2014, Pending.
U.S. Appl. No. 14/194,076, filed Feb. 28, 2014, Pending.
U.S. Appl. No. 14/304,015, filed Jun. 13, 2014, Abandonded.
U.S. Appl. No. 14/305,998, 2014-0373148, filed Dec. 18, 2014, Pending.
U.S. Appl. No. 14/317,785, 2015-0026808, filed Jan. 22, 2015, Pending.
U.S. Appl. No. 14/616,387, filed Feb. 6, 2015, Pending.
U.S. Appl. No. 14/668,329, filed Mar. 25, 2015, Pending.
Kristoff, Botnets, Detection and Mitigation: DNS-Based Techniques, NU Security Day (2005) 23 pages, www.it.northwesterd.edu/bin/docs/bots_Kristoff_jul05.ppt.
Mekky et al. "Detecting Malicious HTTP Redirections Using Trees of User Browser Activity" (2014) IEEE Infocom 2014, pp. 1159-1167.

* cited by examiner

| Table 1 |
|---|
| ulakt-prraithynbrwvs.com |
| latemusoallxuczmail.com |
| nlehqxitxaunsfdj-vusa.com |
| nvqbxi-namxeshqirni.com |
| lfabnskcvatemoabstw.com |
| omibenuspuddricadlssk.com |
| viwap-acrfpel-njeno.com |
| adregdcmiwylegbcolj.com |
| rdqwwhdnrqhvhkcajmw.com |
| atkhuttvvagtompzdeed.com |
| plmlqmipirutlxeblwi.com |
| vqvseorplixindrcrowh.com |
| axiurcxccqxxtihsrvmiu.com |
| likfipchititilvzinkven.com |
| ispkaqraqtdiapadlvf.com |
| fanqilbrve-fqvvrgues.com |
| kfvccwfefqolo-vvnoby.com |
| apdiw-afwiwipwnlfq.com |
| tcbgsxtacikrhwkstaf.com |
| ocgncqcxstibimwvosvv.com |
| traichtlkovhgwepivwmh.com |
| satorit-apcwmxdcbert.com |
| wxwthqqcwppbce-wxmlq.com |
| icvnisaccrilkm-nwlvt.com |
| cabtqhsiridvmiporniif.com |
| ieopnhmixcvtinorvqch.com |
| brvtaarorkymnuxdtwvp.com |
| gwwih-dkintrivaawpcf.com |
| ccfinacninikthqrawil.com |
| lbrickrfiafimeaerfnl.com |
| vvvpjdmavansoih-uswkw.com |
| vkaleoxcaeqwihopkrt.com |
| cawakemvkhihwecvdy.com |

| Table 2 |
|---|
| mdecub-xdvg.ru |
| mgeia-bngm.com |
| nkoza-digrk.com |
| nmoby-dotn.com |
| mpeded-axcz.ru |
| msofy-debef.com |
| mvahit-uhm.ru |
| mzakef-jhos.ru |
| mfenat-anyg.ru |
| meput-emm.ru |
| mlenaf-ovot.ru |
| mpervt-nxeb.ru |
| mrvvof-ibah.ru |
| mvvzxf-ofop.ru |
| mxvbif-aaav.ru |
| mbucet-vbc.m |
| mhtlif-ipm.ru |
| mbugat-isop.ru |
| mkum-fovew.com |
| mulof-azud.ru |
| mqjmv-fecok.com |
| mvipof-vfad.ru |
| mxoref-avx.ru |
| mbotif-mnfi.ru |
| mdovet-opol.ru |
| mgoxn-geses.com |
| mkaba-gvvuz.com |

METHOD AND SYSTEM FOR DETECTING DGA-BASED MALWARE

CROSS-REFERENCE TO RELATED APPLICATIONS

This application claim the benefit of U.S. Patent Application No. 61/590,633, filed Jan. 25, 2012, which is incorporated by reference in its entirety.

This application is related to U.S. patent application Ser. No. 12/985,140, filed Jan. 5, 2011, which is incorporated by reference in its entirety.

DESCRIPTION OF EMBODIMENTS OF THE INVENTION

Figure 1:
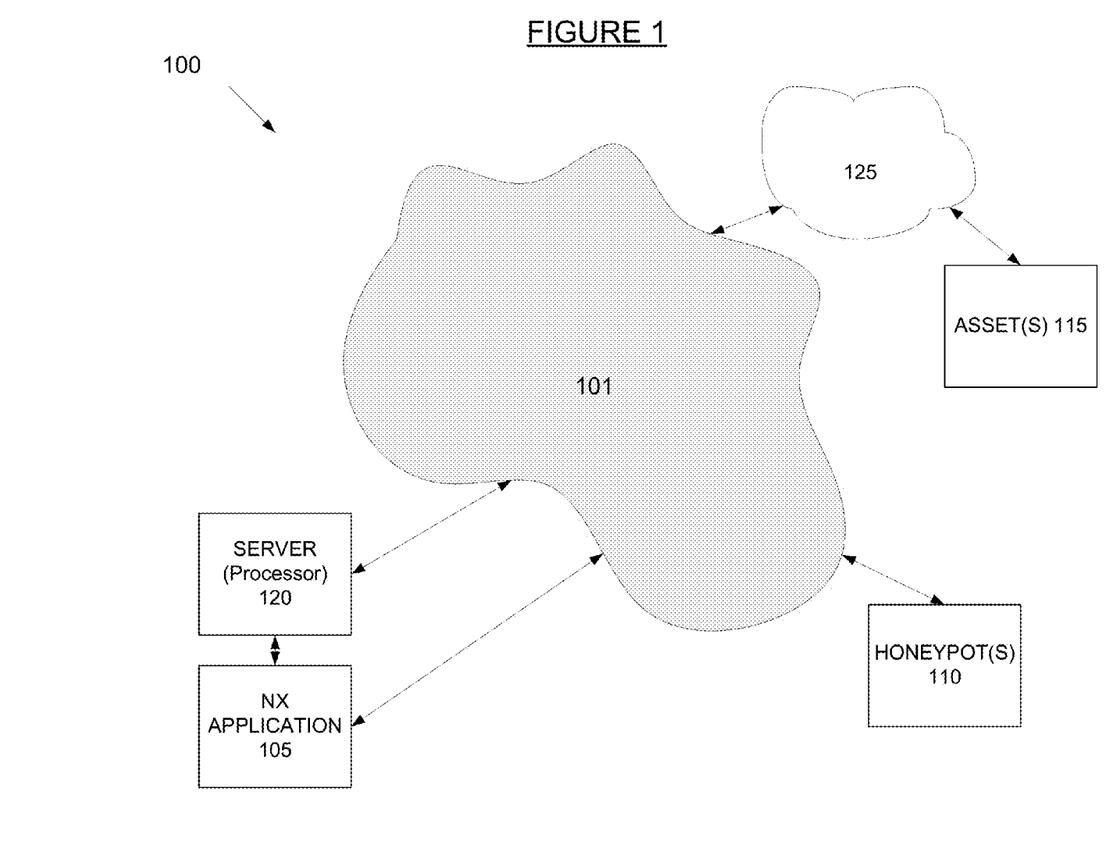
FIG. 1 illustrates a system for detecting malware, according to an embodiment.

FIG. 1 illustrates a system for detecting malware, according to an embodiment. FIG. 1 illustrates a network 101 (e.g., the Internet, intranet) connecting a NX application 105 (described in more detail below) that may be run on a server 120 to a honeypot 110 and an entity's network 125 (e.g., a private network of a company, non-profit, government, quasi-government entity, etc.). The NX application 105 may help identify computers (e.g., assets 115) within a monitored entity's network 125 that are compromised with domain generation algorithm (DGA)-based bots. When a known botnet's command and control (C&C) domain is known, botnet traffic may be detected and blocked. A DGA may be used by botmasters to develop botnets that will discover their C&C server through automatically generated domain names. In order to contact the botmaster, each bot may periodically execute the DGA that, given a seed (e.g., the current date), may produce a list of candidate C&C domains. The bot may then attempt to resolve the domain names by sending domain name system (DNS) resolution requests (or simply queries) until one of the domains resolves to an IP address and the related DNS response returns the IP address of a C&C server. This strategy provides high agility to the botnet C&C infrastructure, because even if one or more C&C domain names or IP addresses are identified and taken down, the bots may still rediscover the IP address of the current (or up-to-date) C&C server via DNS queries to the next set of automatically generated domain names.

A device may be placed (e.g., below the local recursive domain name server (RDNS) or at the edge of a network) that may monitor DNS query/response messages from/to the computers within the network. For example, queries to domain names that result in non-existent domain (NX DOMAIN) response code (RCODE) messages (e.g, domain names for which no mapping to an IP addresses exists) may be analyzed. These types of unsuccessful domain name resolutions may be referred to as NX domains. To identify automatically generated domain names, NX application 105 may search for relatively large clusters of NX domains that have similar syntactic features and are queried by multiple (e.g., potentially compromised by DGA-enabled malware) computers during a given time period (e.g., one day). As multiple computers may be compromised with the same DGA-based bots, these computers may generate several DNS queries resulting in NX domain names, and many of these NX domain names may be queried by more than one computer. In addition, NX application 105 may identify and filter out natural user-generated NX domain names (e.g., due to typos, etc.). Once NX application 105 finds a cluster of NX domain names, this cluster may represent a sample of domain names generated by a DGA. At this point, NX application 105 may apply statistical data mining techniques to build a model of the DGA that may be used to track compromised assets running the same DGA-bot (e.g., in real-time or near real-time).

Figure 2:
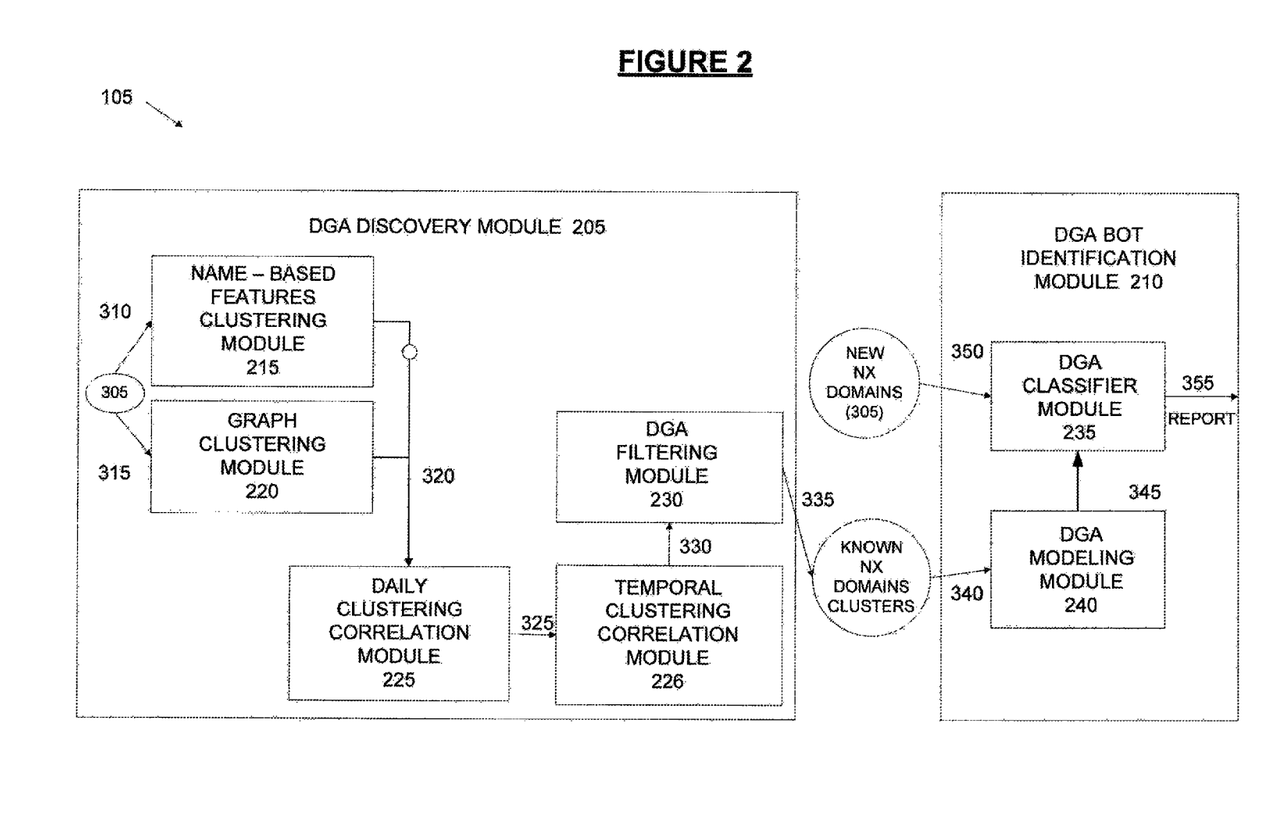
FIG. 2 illustrates details of a NX application, according to an embodiment.

FIG. 2 illustrates details of the NX application 105, according to an embodiment. The NX application 105 may comprise: a DGA discovery module 205 and/or a DGA bot identification module 210. The elements of the DGA discovery module 205 and the DGA bot identification module 210 will be set forth and then described in more detail below.

The DGA discovery module 205 may analyze streams of NX domains generated by assets 115 located within a monitored network 125 to identify, in an unsupervised way, clusters of NX domains that are being automatically generated by a DGA. The NX domains generated by network users querying non-existent domain names may be collected during a given epoch E. Then, the collected NX domains may be clustered. The DGA discovery module 205 may comprise: a name-based features clustering module 215, a graph clustering module 220, a daily clustering correlation module 225, a temporal clustering correlation module 226 or a DGA filtering module 230, or any combination thereof.

Figure 4:
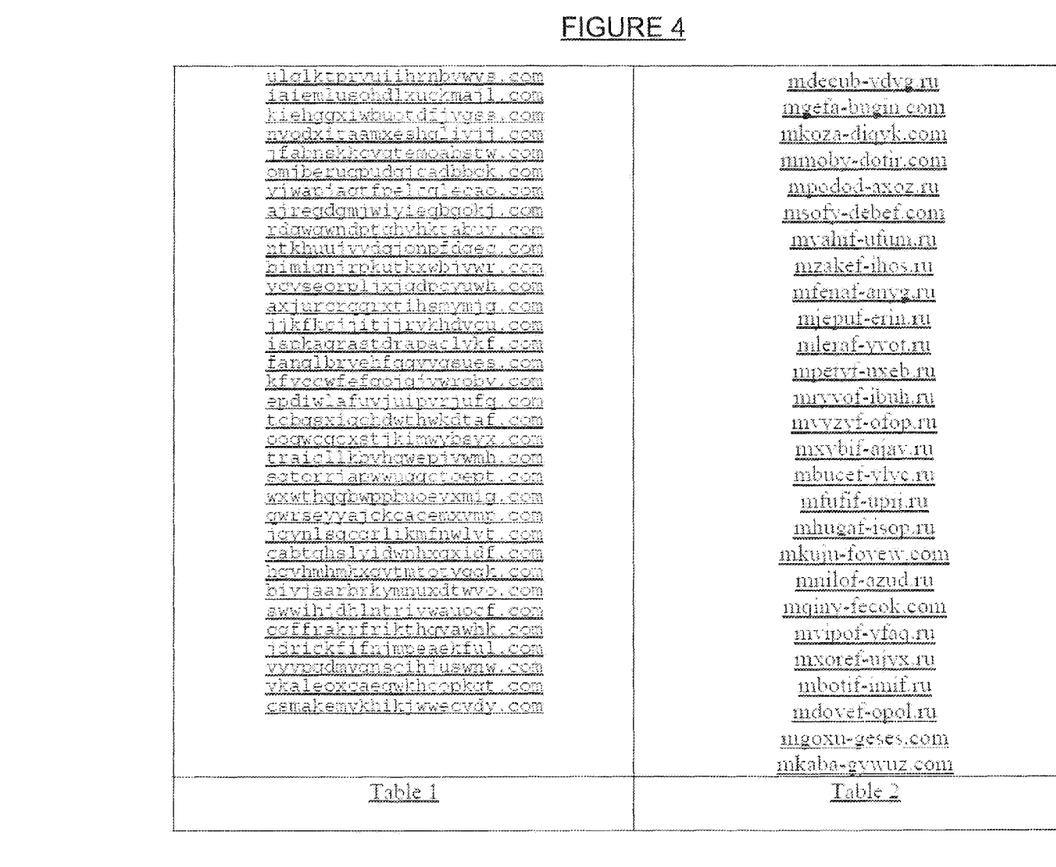
FIG. 4 is an example of clustering where domain names strings have similar statistical features.

The name-based features clustering module 215 may cluster NX domains if the domain names strings have similar statistical features (e.g., similar length, similar level of randomness (e.g., Table 1 of FIG. 4), similar character frequency distribution (e.g., Table 2 of FIG. 4 where NX domains ending in .ru have the pattern xxxxxx-xxxxx.ru and NX domains ending in .com have the pattern xxxxx-xxxxx-.com)). The graph clustering module 220 may cluster NX domains if the domain names have been queried by overlapping sets of computers. The daily clustering module 225 may be used to combine two independent clustering modules: the name-based features clustering module 215 and the graph clustering module 220. By combine the clustering outputs from these two different clustering techniques, highly correlated clusters of NX domains may be obtained.

After obtaining the correlated clusters of NX domains via the daily cluster correlation module 225, the temporal clustering correlation module 226 may utilize a rolling window of two consecutive epochs to correlate temporal clusters that may include assets that consistently create NX domains that may tend to cluster together (e.g., according to the name-based features clustering and the graph clustering). The resulting temporally correlated clusters may be forwarded to the DGA filtering module 230. The DGA filtering module 230 may prune away clusters of NX domains that are already known, and therefore reduce the output to clusters that are composed by previously unseen and not modeled DGA NX domain traffic. In this way, modules 215, 220, 225, 226 and 230 may group together domain names that likely were automatically generated by the same algorithm running on multiple machines within the monitored network.

The DGA bot identification module 210 may analyze the assets collecting the NX domains. While the DGA discovery module 205 may consider collections of assets, the DGA bot identification module 210 may consider each asset separately. The DGA bot identification module 210 may comprise: a DGA classifier module 235 and/or a DGA modeling module 240. The DGA classifier module 235 may model DGA traffic and may use machine learning on NX domain data present in a knowledge base as well as reports of unknown DGAs arriving from the DGA discovery module 205. The clustering done by modules 215, 220, 225, 226 and 230 may contain groups of domain names that happen to be similar due to reasons other than that they were generated by the same algorithm (e.g., NX domains due to common typos or to misconfigured applications). Thus, the DGA classifier module 235 may be used as a filter that may help eliminate noisy clusters. The DGA classifier module 235 may prune NX domain clusters that appear to be generated by DGAs that have been previously discovered and modeled, or that contain domain names that are similar to popular legitimate domains. The DGA modeling module 240 may be responsible for two operations: the asset classification and the DGA modeling processes. Each asset may be classified on a daily basis using the stream of NX domains that is generated. These NX domains may be grouped in sets of $\alpha$, and classified against models of known DGAs. The DGA classifier module 235 may be trained using the following sources of labeled data: a large list of popular legitimate domain names; NX domains collected by running known DGA-bot samples in a controlled environment; or clusters of NX domains output by the DGA discovery module 205 that undergo manual inspection and are confirmed to be related to yet-to-be-named botnets; or any combination thereof. For example, the DGA modeling module 240 may receive different sets of labeled domains (e.g., Legitimate, DGA-Bobax, DGA-Torpig/Sinowal, DGA-Conficker.C, DGA-UnknownBot-1, DGA-UnknownBot-2, etc.) and may output a new trained DGA classifier module 235.

The elements of the DGA discovery module 205 and the DGA bot identification module 210 have been set forth above. These are now described in more detail.

DGA Discovery Module 205.

The DGA discovery module 205 may comprise: a name-based features clustering module 215, a graph clustering module 220, a daily clustering correlation module 225, a temporal clustering correlation module 226 or a DGA filtering module 230, or any combination thereof. These modules are described in detail below.

Name-Based Features Clustering Module 215.

Using all the NX domains observed in an epoch, and using groups of $\alpha$ sequential NX domains per asset, multiple name-based features may be computed. For example, in one embodiment, multiple (e.g. 33) features from the following families may be computed: n-gram features (NGF); entropy-based features (EBF); or structural domain features (SDF); or any combination thereof (These feature families are described in more detail below.) After computing all vectors in the epoch, X-means clustering (XMC) may be used to cluster vectors composed by $\alpha$ NX domains that share similar name-based statistical properties. In some embodiments, this name-based features clustering does not need to take into consideration the individual assets that generated the NX domains.

For example, assume that for epoch $t_i$, XMC is run to obtain a set of clusters:

$$CIDS_{XMC}^{t_i} = \{cid_{XMC,1}^{t_i}, \ldots, cid_{XMC,\beta}^{t_i}\}$$

where CID may be classer identification; CIDS may be the set of all classer IDs, $cid_{XMC_k}^{t_i} = \{tup_1, \ldots, tup_m\}$ may be a set of m tuples $tup_m = <d, ip>$, d may be an NX domain, and ip may be the assets' IP addresses that generated the assets during epoch $t_i$ and ended up in the $k^{th}$ cluster. $\beta$, where $1 \leq k \leq \beta$ may be defined as the final number of clusters that the XMC process produced after clustering the NX domains from the epoch $t_i$.

Statistical Features.

As a reference, the definitions and notation used for various example statistical features are described below. The statistical features may be referred to as name-based features. Name-based features may aim to model the statistical properties of domain name strings. The motivation behind these features may include the fact that DGAs typically take an input seed and generate domain name strings by following a deterministic algorithm. These domains may often have a number of similarities, such as similar length, similar levels of randomness, and a similar number of domain levels. Name-based statistical features may comprise: n-gram features (NGF); entropy-based features (EBF); or structural domain features (SDF); or any combination thereof.

Notation.

A domain name d comprises a set of labels separated by dots (e.g., www.example.com). The rightmost label may be called the top-level domain (TLD or TLD(d)) (e.g., com). The second-level domain (2LD or 2LD(d)) may represent the two rightmost labels separated by a period (e.g., example.com). The third-level domain (3LD or 3LD(d)) may contain the three rightmost labels (e.g., www.example.com). In some embodiments, only NX domains that have a valid TLD appearing in the ICANN TLD listing (e.g., http://www.icann.org/en/tlds/.) may be considered. A domain name d may be called an NX domain if it does not own any resource record (RR) of Type-A. In other words, d may be called an NX domain if it does not resolve to any IP address.

The IP address of an asset in a monitored network that relies on the network's local recursive DNS server (RDNS) to resolve domain names may be defined as $IP_j$. (Note that the approach may be generalized to machines that use an external resolver (e.g., Google's Public DNS). This IP address could represent a single machine, a NAT or proxy device.) The sequence of NX domains generated by IP address $IP_j$ (e.g., the IP address of the requester) during an epoch $t_i$ may be defined as $N_{IP_j}^{t_i} = \{d_1, d_2, \ldots, d_m\}$. In one embodiment, $N_{IP_j}^{t_i}$ may be split into a number of subsequences $NX_{IP_{j,k}}^{t_i} = \{d_r, d_{r+1}, \ldots, d_{r+\alpha+1}\}$ of length $\alpha$, where $r = \alpha \cdot (k-1)+1$ and $k=1, 2, \ldots, (m/\alpha)$. Subscript k may indicate the $k^{th}$ subsequence of length $\alpha$ in the sequence of m NX domains $N_{IP_j}^{t_i}$.

Given a sub-sequence of NX domains $NX_{IP_{j,k}}^{t_i}$ of length $\alpha$ generated during epoch $t_i$, in some embodiments, three groups of name-based features may be extracted.

n-Gram Features (NGF).

Given a sequence $NX_{IP_{j,k}}^{t_i}$ of $\alpha$ NX domains, this group of features measures the frequency distribution of n-grams across the domain name strings, for a given value of $n=1, \ldots, 4$. For example, for $n=2$, the frequency of each 2-gram may be computed. At this point, the median, average, and standard deviation of the obtained distribution of 2-gram frequency values may be computed, and thus three features may be obtained. In some embodiments, this may be done for each value of $n=1, \ldots, 4$, thus producing 12 statistical features.

This group of features may try to capture whether the n-grams are uniformly distributed, or if some n-grams tend to have a much higher frequency than others. While this group of features by itself may not be enough to discriminate domains generated by DGAs from domains generated by human typos, when combined with other features, they may yield high classification accuracy.

Entropy-Based Features (EBF).

This group of features may compute the entropy of the character distribution for separate domain levels. For example, the character entropy for the 2LDs and 3LDs extracted from the domains in $NX_{IP_{j,k}}^{t_i}$ may be separately computed. For example, consider a set $NX_{IP_{j,k}}^{t_i}$ of α domains. First, the 2LD of each domain $d_i \in NX_{IP_{j,k}}^{t_i}$ may be extracted, and for each domain the entropy $H(2LD(d_1))$ of the characters of its 2LD may be computed. Then, the average and standard deviation of the set of values $\{H(2LD(d_i))\}_{i=1 \ldots \alpha}$ may be computed. This may be repeated for the 3LDs and for the overall domain name strings. At each level, the period characters separating the levels may be removed. Overall, six features based on character entropy may be created.

This group of features may determine the level of randomness for the domains in $NX_{IP_{j,k}}^{t_i}$, and may be motivated by the fact that a number of DGAs used by botnets may produce random-looking domain name strings. These features may carry a signal that contributes to distinguishing between NX domains due to certain DGAs and legitimate NX domains related to typos.

Structural Domain Features (SDF).

This group of features may be used to summarize information about the structure of the NX domains in $NX_{IP_{j,k}}^{t_i}$, such as their length, the number of unique TLDs, and the number of domain levels. In some embodiments, 14 features may be computed. Given the set of domains $NX_{IP_{j,k}}^{t_i}$, the average, median, standard deviation, and variance may be computed for: the length of the domain names (adding up to four features) and the number of domain levels (adding up to four features). In addition, the number of distinct characters that appear in these NX domains may be computed (one feature). The number of distinct TLDs (one feature) and the ratio between the number of domains under the .com TLD and the number of NX domains that use other TLDs (one feature) may also be computed. In addition, the average, median and standard deviation of occurrence frequency distribution for the different TLDs (adding up to three features) may also be computed. Note that some or all of these features may be computed in some embodiments. Additional features may also be computed with none, some or all of these features in other embodiments.

Graph Clustering (GC) Module 220.

As discussed above, NX domains may be clustered based on the relationships of the assets that query them. A sparse association matrix M may be created, where columns represent NX domains, and rows represent assets that query more than two NX domains over the course of an epoch T. $M_{i,j}=0$ if asset i did not query NX domain j during epoch T. Conversely, $M_{i,j}=1 \times w$ if i did query j, where w may be a weight.

To assign weights to M to influence clustering, an approach analogous to tfc-weighting in text classification tasks may be used. (For more information on tfc-weighting, see K. Aas and L. Eikvil, Text Categorization: A Survey, 1999; and R. Feldman and J. Sanger, The Text Mining Handbook: Advanced Approaches in Analyzing Unstructured Data, Cambridge Univ. Pr. 2007, which are both herein incorporated by reference.) The basic idea may revolve around a common property of document collections: as more documents contain a given term, the less likely the term is representative of a document. For example, in a representative sample of English documents, the term and definite article "the" likely appears in most of them and poorly describes document content. Conversely, the term "NASA" may appear in fewer documents and probably only in documents with content similar to the term. To adjust for this, the inverse document frequency, or idf, may be used to give a lower weight to terms that appear frequently across the document collection, and a higher weight to terms that are uncommon. In the example of NX domains, the NX domains may be considered the "documents" to be clustered, and the assets may be the "terms" used to generate weights. As such, as more NX domains are queried by an asset, the less likely the asset may be representative of the NX domains it queries. Therefore, a weight w may be assigned to all assets such that $w \sim 1/k$, where k may be the number of NX domains the asset queries.

Once the weights are computed, a spectral clustering graph partitioning strategy may be followed on the association matrix M. This technique may require the computation of the first p=15 eigenvectors of M. This may create a p-dimensional vector for each of the NX domains in M. We may use the derived vectors and X-means to cluster the NX domains based on their asset association. We may obtain a set of clusters, $CIDS_{GC}^{t_i}=\{cid_{GC,1}^{t_i}, \ldots, cid_{GC,\gamma}^{t_i}\}$ where $cid_{GC_k}^{t_i}=\{tup_1, \ldots, tup_m\}$ may be a set of m tuples, tup=<d, ip>, d may be an NX domain name, and ip may be the assets' IP address that generated the assets during epoch $t_i$ and ended up in the $k^{th}$ cluster. In addition, γ, where $1 \leq k \leq \gamma$, may be the final number of clusters produced by the XMC process.

In some embodiments, the presented graph clustering technique may become less effective if a DGA generates a high volume of domain names daily while any DGA-infected asset only queries a very small subset of them, because this may significantly decrease the probability that a NX domain is looked up by two DGA-infected assets under the same epoch. On the other hand, a botnet based on such a DGA may come with a heavy toll for the botmaster because this botnet may significantly decrease the probability of establishing a C&C connection.

Daily Cluster Correlation Module 225.

After the completion of the XMC (by 215) and graph clustering (GC) (by 220), the daily cluster correlation module 225 may associate NX domains between the sub-clusters produced from both the XMC and graph clustering processes. This daily cluster correlation may be achieved by the intersection of tuples (e.g., NX domain names and the assets that generated them) between clusters derived from the name-based features clustering module 215 and clusters derived from the graph clustering module 220, during the same epoch. All possible daily correlation clusters that have at least one tuple in common may be created. The correlation process may then be defined. Let $DC_k^{t_i}=\{tup_1, tup_1, \ldots, tup_m\}$ be the daily correlation cluster $DC_k^{t_i}$ where the Jacard similarity index between the tuples of $cid_{XMC_k}^{t_i}$ and $cid_{GC_j}^{t_i}$ may be greater than θ=0, during the epoch $t_i$ for the $k^{th}$ cluster in the set $CIDS_{XMC}^{t_i}$ and the $j^{th}$ cluster in the set $CIDS_{GC}^{t_i}$.

If $m \in cid_{XMC_k}^{t_i}$ and $m \in cid_{GC_j}^{t_i}$, then $cid_{XMC_k}^{t_i}$ and $cid_{GC_j}^{t_i}$ may be correlated in epoch $t_i$ with m tuples in common, and may produce a new correlation cluster referred to as $DC_k^{t_i}$. This process may be repeated between all clusters in $cid_{XMC_k}^{t_i}$ and $cid_{GC_j}^{t_i}$. The set with all daily correlated clusters may be $DCC^{t_i}=\cup_{r=1 \ldots \mu} DC_r^{t_i}$. The value of m may be bounded by the number of tuples in each of the $cid_{XMC_k}^{t_i}$ and $cid_{GC_j}^{t_i}$ clusters. However, the value of z may have an upper bound μ. This bound may be the maximum number of daily correlated cluster $\beta \times \gamma \leq \mu$, where β may be the size of the set $CIDS_{XMC}^{t_i}$ and γ the size of the set $CIDS_{GC}^{t_i}$. In reality, the value of µ may be significantly lower than $\beta \times \gamma \leq \mu$, because not all clusters may be correlated to each-other.

Temporal Cluster Correlation Module 226.

After obtaining the correlated clusters of NX domains via the daily cluster correlation module 225, a rolling window of two consecutive epochs may be used to correlate temporal clusters that may include assets that consistently create NX domains that may tend to cluster together (according to the XMC (done by 215) and GC (done by 220)). The resulting temporally correlated clusters may be forwarded to the DGA filtering module 230. The process that gives us the temporally correlated clusters is defined below.

Let $TC_k^{t_i} = \{tup_1, tup_1, \ldots, tup_n\}$ be the temporal correlation cluster $TC_k^{t_i}$, which may be derived on the epoch $t_i$ after the correlation of the following two clusters: $DC_j^{t_{i-1}}$ and $DC_j^{t_i}$, where $DC_j^{t_{i-1}} \in DCC^{t_{i-1}}$ and $D_l^{t_{i-1}} \in DCC^{t_i}$. The n tuples within the $TC_k^{t_i}$ cluster may be found already in daily correlated clusters created in the last two consecutive epochs, $DC_j^{t_{i-1}}$ and $DC_l^{t_i}$. To derive the tuples within $TC_k^{t_i}$, a set $A_{ips}^{t_{i-1}}$ may be selected that contains the IP addresses (or assets) in the tuples from the cluster $DC_j^{t_{i-1}}$. Using the same logic, a set $B_{ips}^{t_i}$ may be collected with all the IP addresses in the tuples from the cluster $DC_l^{t_i}$. The Jaccard similarity index may then be computed between the sets $A_{ips}^{t_{i-1}}$ and $B_{ips}^{t_i}$. (The following reference, which is herein incorporated by reference, provides more information on the Jaccard similarity index: http://en.wikipedia.org/wiki/Jaccard_index.) In some embodiments, the Jaccard similarity index must exceed the temporal correlation threshold $\tau$ (in our case $\tau=0$) to form the temporal cluster $TC_k^{t_i}$. To assemble the tuples in the temporal cluster, the set of IP addresses $C_{ips}^{t_i}$, where $C_{ips}^{t_i} = A_{ips}^{t_{i-1}} \cap B_{ips}^{t_i}$ may be extracted. Using the IP addresses in the set $C_{ips}^{t_i}$, the set of tuples may be aggregated by collecting all tuples in $DC_j^{t_{i-1}}$ and $DC_j^{t_i}$ that contain IP addresses in the set $C_{ips}^{t_i}$. Finally, the temporal cluster may be formed if more than $\alpha$ distinct NX domains are derived from the tuples collected. At least $\alpha$ unique NX domains may be needed to characterize the temporal cluster. This process may be repeated between all daily correlated clusters in $DCC^{t_{i-1}}$ and $DCC^{t_i}$. All temporal correlated clusters may be forwarded to the DGA filtering module 230.

DGA Filtering Module 230.

When the DGA filtering module 230 receives the new temporal clusters, the DGA filtering module 230 breaks the NX domains in each cluster in random sets of cardinality $\alpha$. Then, in some embodiments, using the same three feature families (e.g., NGF, EBF and SDF), the DGA filtering module 230 may compute vectors and classify them against the models built from the known DGA models. Each temporal cluster may be characterized using the label with the highest occurrence frequency after the characterization process. The NX domains used to compile vectors that do not agree with the label with the highest occurrence may be discarded. The temporal cluster confidence may be computed by the average confidence from all vectors of the highest occurrence label in the temporal cluster.

Clusters may be excluded that are very similar (more than 98% similarity) to the already known DGA models. Any temporal clusters that were characterized as benign may also be discarded. All remaining temporal clusters that do not fit any known model may be candidates for compiling new DGA models (see 335 of FIG. 3). Once the new models are built, they may become part of the DGA classifier module 235.

DGA Bot Identification Module 210.

As set forth above, the DGA bot identification module 210 may comprise a DGA modeling module 240 and/or a DGA classifier module 235. These modules are described in detail below.

DGA Classifier Module 235.

The DGA classifier module 235 may utilize a Random Forest meta-classification system. (The following reference, which is herein incorporated by reference, provides more information on the random forest meta classification system: http://en.wikipedia.org/wiki/Random_forest.) This DGA classifier module 235 may be able to model statistical properties of sets of NX domains that share some properties. The models may be derived from training datasets, which may be composed using sets with size $\alpha$ of domain names to compile vectors using the NGF, EBF and SDF statistical feature families. The DGA classifier module 235 may model successfully all known malware DGAs (e.g., Conficker, Murofet, etc.). Furthermore, the DGA classifier module 235 may clearly differentiate them from domain names in the top Alexa rankings. In some embodiments, the DGA classifier module 235 may operate as follows: First, vectors from each DGA family (or class) may need to be populated. To do so, NX domains from each class may be grouped into sets of $\alpha$ sequential domains. Using the statistical features from the families NGF, EBF and SDF, a single vector for the set of $\alpha$ domain names may be computed. Then, a tree-based statistical classifier may be used to train it against all classes of DGAs we have and against the benign class from the Alexa domain names. Once the DGA classifier module 235 is trained with a balanced number of vectors for each class, we may proceed with classification of $\alpha$ sequential NX domains (per asset) as they arrive from the ISP sensor.

DGA Modeling Module 240.

The temporal clusters that do not fit any known model according to the confidences that the DGA classifier module 235 assigns to them may be candidates for the DGA modeling module 240. One goal of the DGA modeling module 240 may be to harvest the maximum possible NX domains per temporal cluster. Another goal may be to use the collected NX domains to model the new DGAs. To achieve this, the NX domains from assets that comprise the temporal cluster that may be a candidate for DGA modeling may be aggregated. The set of NX domains that may be used to build the model may be all the NX domains in the tuples within the temporal cluster. Using the statistical features from the NGF, EBF and SDF families, and, as a seed, the NX domains derived from the assets in the temporal cluster, the training dataset for each new DGA variant may be compiled. The new training dataset may be compiled using again the same Random Forest meta-classification system used in the DGA classifier module 235. Once the new models are built, the models may be pushed to the DGA classifier module 235 and network assets may be classified against the newly discovered DGAs. A classification report per asset, as the set of $\alpha$ NX domains per asset gradually get classified, may be provided.

Figure 3:
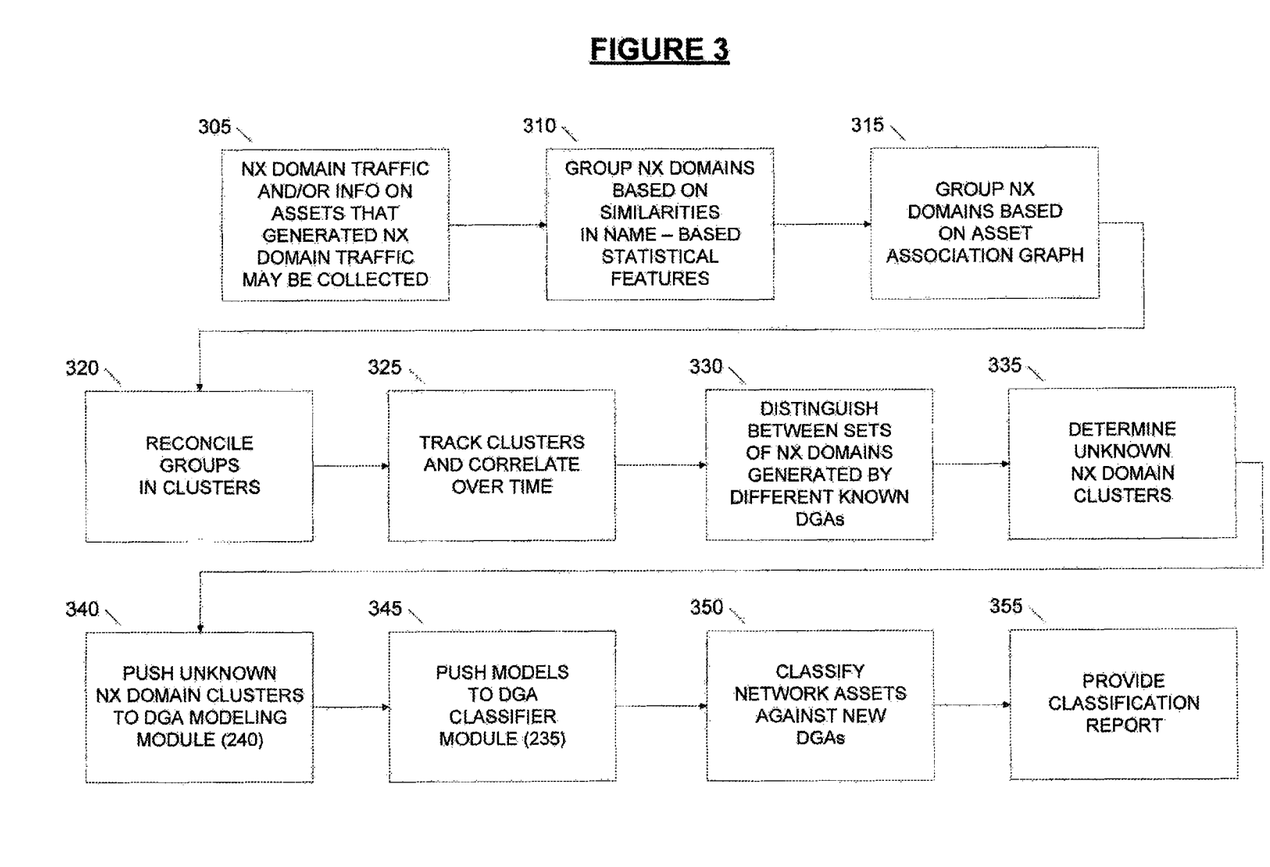
FIG. 3 illustrates a method of detecting malware, according to an embodiment.

FIG. 3 illustrates a method of detecting malware, according to an embodiment. (Note that FIG. 2 also illustrates how the steps of FIG. 3 may be performed using the various components of FIG. 2.) In 305, NX domain traffic (e.g., sequences of NX domains) and/or information on the assets that generated the NX domain traffic during an epoch (e.g., one day) may be collected. In 310, the NX domains may be grouped by the name-based features clustering module 215 based on similarities in their name-based statistical features. In 315, the NX domains may be grouped by the graph clustering module 220 based on an asset association graph in which a node may represent a NX domain and the weight between two nodes may indicate whether the related NX domains are both queried by a common subset of network assets. In 320, the two distinct views of similarities among NX domains (name-based statistical features, asset association) may then be reconciled by the daily cluster correlation module 225. In 325, the obtained NX domain clusters may be tracked over time and correlated across different contiguous epochs by the temporal cluster correlation module 226. This may be done to increase the quality of the final NX domain clusters and eliminate possible noise introduced by domain clusters that may appear merely by a change in any given epoch.

Once the clustering and cluster correlation is done, the results may include groups of NX domains, where each group of NX domains may contain domains that are likely to be automatically generated by the same DGA. Thus, for each of the NX domain clusters, it may be determined whether its domains are related to a newly discovered (e.g., never seen before) DGA, or a previously seen DGA. In 330, the DGA filtering module 230 may be used to distinguish between sets of NX domains generated by different known DGAs. If an NX domain cluster is found to match one of the previously modeled DGAs, it may be discarded (although it might also be used to further refine the supervised classifier) because at this stage discovering new DGAs may be useful. After it has been determined in 335 that a cluster of NX domains is related to a new (unknown) DGA, in 340 this information may be sent to the DGA modeling module 240 of the DGA-bot identification module 210, which may attempt to model the new (unknown) DGA(s). In 345, the newly modeled DGA may be pushed to the DGA classifier module 235, which may be retrained to account for the newly discovered domain generation pattern(s). In 350, the network assets may be classified against the previously known and new DGAs in the DGA classifier module 235. In 355, a classification report may be provided.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages, are presented for example purposes only. The disclosed methodology and system are each sufficiently flexible and configurable, such that it may be utilized in ways other than that shown.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Any Abstract of the Disclosure is not intended to be limiting as to the scope of the present invention in any way.

It should also be noted that the terms "a", "an", "the", "said", etc. signify "at least one" or "the at least one" in the specification, claims and drawings. In addition, the term "comprises" signifies "including, but not limited to".

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method for detecting a domain generation algorithm (DGA), comprising:
   obtaining, from an electronic database, a plurality of non-existent (NX) domain names comprising a top-level domain (TLD), a second-level domain (2LD), and a third-level domain (3LD);
   clustering, utilizing a name-based clustering module, a portion of the plurality of NX domain names based on at least one of n-gram features (NGF), entropy-based features (EBF), and structural domain features (SDF);
   wherein the TLD, 2LD, and 3LD are all utilized by the name-based clustering module;
   clustering, utilizing a graph clustering module, another portion of the plurality of NX domain names based on groups of assets that queried the NX domain names;
   associating, utilizing a daily clustering correlation module, one or more NX domain names from the name based clustering model with one or more NX domain names from the graph clustering model;
   responsive to the daily clustering, associating, utilizing a temporal clustering correlation module, one or more NX domain names from different clusters based on a rolling window of two consecutive epochs; and
   determining whether a DGA that generated the clustered NX domain is unknown.

2. The method of claim 1, further comprising: responsive to determining that a DGA is unknown sending the unknown DGA to a DGA classification module.

3. The method of claim 2, further comprising: modeling the DGA.

4. The method of claim 3, further comprising: providing a report about the DGA.

5. The method of claim 1, further comprising: monitoring DNS traffic below a local recursive DNS server;
   wherein the DNS traffic is stored in the electronic database.

6. The method of claim 1, wherein unknown DGA are used to train new DGA classifier modules.

7. A system for detecting a domain generation algorithm (DGA), comprising:
   a non-transitory device comprising a processor 2
   obtain, form an electronic database, a plurality of non-existent (NX) domain names comprising a top-level domain (TLD), a second-level domain (2LD), and a third-level domain (3LD);
   cluster, utilizing a name-based clustering module, a portion of the plurality of NX domain names based on at least one of n-gram features (NGF), entropy-based features (EBF), and structural-domain features (SDF);
   wherein the TLD, 2LD, and 3LD are all utilized by the name-based clustering module;
   cluster, utilizing a graph clustering module, another portion of the plurality of NX domain names based on groups of assets that queried the NX domain names;
   associate, utilizing a daily clustering correlation module, one or more NX domain from the name based clustering model with one or more NX domain names from the graph clustering model;
   responsive to the daily clustering, associate, utilizing a temporal clustering correlation module, one or more NX domain names from different clusters based on a rolling window of two consecutive epochs; and determine whether a DGA that generated the clustered NX domain names is unknown.

8. The system of claim 7, wherein the processor is further configured to: responsive to the determination that a DGA is unknown sending the unknown DGA to a DGA classification module.

9. The system of claim 8, wherein the processor is further configured to: model the DGA.

10. The system of claim 9, wherein the processor is further configured to: provide a report about the DGA.

11. The system of claim 7, wherein the processor is further configured to: monitor DNS traffic below a local recursive DNS server.

12. The system of claim 8, wherein unknown DGA are used to train new DGA classifier modules.

13. The method of claim 1, wherein the clustering is based on n-gram features, and wherein the n-gram features comprise: measuring a frequency distribution of one or more n-grams across the TLD, 2LD, and 3LD of the portion of the plurality of NX domain names.

14. The method of claim 1, wherein the clustering is based on entropy-based features, and wherein the entropy-based features comprise: determining a level of randomness for the portion of the plurality of NX domain names based on computing an entropy of a character distribution for the 2LD and the 3LD.

15. The method of claim 1, wherein the clustering is based on structural domain features, and wherein the structural domain features comprise: determining an average, median, standard deviation, and variance for the portion of the plurality of NX domain names based on a length and number of domain levels for each NX domain.

16. The system of claim 7, wherein the clustering is based on n-gram features, and wherein the n-gram features comprise: measuring a frequency distribution of one or more n-grams across the TLD, 2LD, and 3LD of the portion of the plurality of NX domain names.

17. The system of claim 7, wherein the clustering is based on entropy-based features, and wherein the entropy-based features comprise: determining a level of randomness for the portion of the plurality of NX domain names based on computing an entropy of a character distribution for the 2LD and the 3LD.

18. The system of claim 7, wherein the clustering is based on structural domain features, and wherein the structural domain features comprise: determining an average, median, standard deviation, and variance for the portion of the plurality of NX domain names based on a length and number of domain levels for each NX domain.

* * * * *